United States Patent [19]

Burns et al.

[11] Patent Number: 5,486,390
[45] Date of Patent: Jan. 23, 1996

[54] RECYCLABLE BLISTER PACKAGE

[75] Inventors: Donald J. Burns, Lake Zurich, Ill.; A. Michael Nahmias, Victor, N.Y.

[73] Assignee: Mobil Oil Corporation, Fairfax, Va.

[21] Appl. No.: 233,095

[22] Filed: Apr. 25, 1994

[51] Int. Cl.[6] .............................. B32B 3/16; B65D 75/60
[52] U.S. Cl. ................ 428/40; 206/461; 206/467; 206/469; 206/484.2; 206/531; 206/532; 220/359; 229/125.35; 428/41; 428/42; 428/195; 428/483
[58] Field of Search ............................ 428/40, 41, 35.2, 428/42, 483, 195; 206/461, 467, 469, 532, 531, 484.2; 220/359; 229/125.35

[56] References Cited

U.S. PATENT DOCUMENTS

| | | | |
|---|---|---|---|
| 3,734,798 | 5/1973 | Dooley | 156/308 |
| 3,899,080 | 8/1975 | Brunda | 206/531 |
| 4,469,258 | 9/1984 | Wright | 206/631 |
| 4,784,885 | 11/1988 | Carespodi | 428/36.8 |
| 5,229,164 | 7/1993 | Pins et al. | 427/3 |
| 5,236,749 | 8/1993 | Ewing | 428/35.2 |

FOREIGN PATENT DOCUMENTS 284648  10/1988  European Pat. Off. ............... 428/68

*Primary Examiner*—Nasser Ahmad
*Attorney, Agent, or Firm*—Alexander J. McKillop; Dennis P. Santini; Laurence P. Hobbes

[57] ABSTRACT

The invention relates to a blister package comprising:

A) a first sheet selected from the group consisting of polyethylene terephthalate (PET), polyvinyl chloride (PVC), and polyvinyl chloride (PVC) coated with polyvinylidene chloride (PVDC) having a blister which forms a compartment;

B) a second sheet releasably adhered to said first sheet, said second sheet comprising an oriented polypropylene (OPP) peel seal film having its side proximal to said first sheet coated with a first adhesive having controlled adhesion of 300–1200 grams per inch; and C) a third sheet of card or paper stock which is adhered to said second sheet at at least fiber tear adhesion levels with a second adhesive.

16 Claims, 1 Drawing Sheet

FIG.
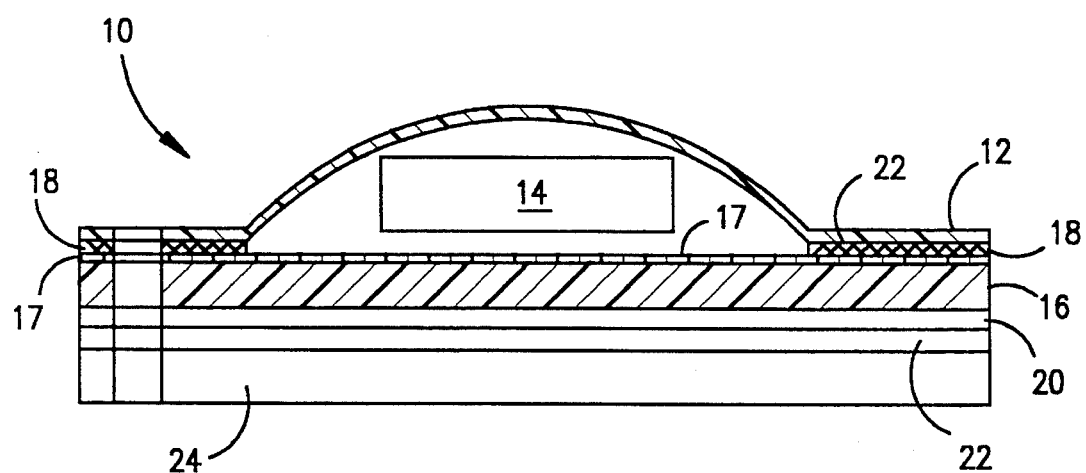

RECYCLABLE BLISTER PACKAGE

This invention relates to a peel seal film and recyclable blister packages which comprise such film.

BACKGROUND OF THE INVENTION

Blister packages are made from a front blister made from material such as polyvinyl chloride or polyethylene terephthalate and a back made from paper or card stock. Disposal of such packages can be difficult given the hazardous by-products produced by incineration of polyvinyl chloride. Moreover, recycling of the front blister is difficult because of the tendency of the separated front blister to contain paper fibers which adhere to the front blister when it is separated from the paper or card stock back.

It would be useful to provide a blister package whose front blister is readily separable from the paper or card stock back without retention of paper fibers thereby permitting reuse of the front blister with another backing or recycle of the front blister.

SUMMARY OF THE INVENTION

The present invention provides a blister package whose front blister is readily reusable or recyclable. In one aspect the present invention relates to a blister package comprising:

A) a first sheet selected from the group consisting of polyethylene terephthalate (PET), polyvinyl chloride (PVC), and polyvinyl chloride (PVC) coated with polyvinylidene chloride (PVDC) having a blister which forms a compartment;

B) a second sheet releasably adhered to said first sheet, said second sheet comprising an oriented polypropylene (OPP) peel seal film having its side proximal to said first sheet coated with a first adhesive having controlled adhesion of 300–1200 grams per inch; and C) a third sheet of card or paper stock which is adhered to said second sheet at at least fiber tear adhesion levels with a second adhesive.

In another aspect, the present invention relates to a blister package comprising:

A) a first sheet selected from the group consisting of polyethylene terephthalate (PET), polyvinyl chloride (PVC), and polyvinyl chloride (PVC) coated with polyvinylidene chloride (PVDC) having a blister which forms a compartment, said first sheet being coated with a first adhesive having controlled adhesion of 300–1200 grams per inch;

B) a second sheet releasably adhered to said first sheet by said first adhesive, said second sheet comprising an oriented polypropylene (OPP) peel seal film; and C) a third sheet of card or paper stock which is adhered to said second sheet at at least fiber tear adhesion levels with a second adhesive.

In still another aspect the present invention relates to a peel seal film for use as a recyclable front blister sheet of a blister package comprising a thermoformable or vacuum formable sheet selected from the group consisting of polyethylene terephthalate (PET), polyvinyl chloride (PVC), and polyvinyl chloride (PVC) coated with polyvinylidene chloride (PVDC) capable of forming a blister which forms a compartment, said sheet being coated with a first adhesive having controlled adhesion of 300–1200 grams per inch.

In still yet another embodiment the present invention relates to a peel seal film for use as a lamina interposed between a front blister sheet and a paper backing of a blister package comprising a releasably adherent sheet comprising an oriented polypropylene (OPP) peel seal film having one side which is to be proximal to said front blister sheet coated with a first adhesive having controlled adhesion of 300–1200 grams per inch; and whose second side is optionally coated with a second adhesive capable of adhesion to said paper backing at fiber tear adhesion levels. The first adhesive can be present in amounts of less than 15 wt % of the front blister sheet, while the second adhesive can be present in amounts of less than 30 wt % of the front blister sheet.

The blister package is composed of a thermoformed or vacuum formed front blister layer made from polyvinyl chloride, polyvinyl chloride coated with polyvinylidene chloride, polyethylene terepthalate (PET), PET-G or R-PET which may have a significant pre- or post-consumer recycled content. This front blister layer is sealed to an OPP coated paper backing by means of a controlled adhesion adhesive, e.g., acrylic or polyvinylidene chloride, which can adhere to the front blister layer while separating from the coated backing when the package is opened. This provides a distinct advantage inasmuch as the separated front blister retains adhesive on its binding surface which permits its reuse either with the same or a different backing. Moreover, inasmuch as the front blister contains only a relatively small amount of adhesive, say, 0.1 to 10 wt %, preferably 0.3 to 0.5 wt % of the total blister weight, the front blister can be recycled with minimal difficulty.

BRIEF DESCRIPTION OF THE DRAWING

The single FIGURE is a cross-sectional side elevational view of a recyclable package constructed in accordance with a preferred embodiment of the present invention.

DETAILED DESCRIPTION OF THE INVENTION

This invention elates to a blister package, generally denoted 10, that comprises a front blister sheet 12 thermoformed or vacuum formed from a sheet of material selected from polyvinyl chloride, polyvinyl chloride coated with polyvinylidene chloride, polyethylene terepthalate (PET), PET-G and R-PET which may have a significant pre- or post-consumer recycled content. Preferably, blister layer 12 is transparent so that a user may identify an item 14 which is stored in package 10. This layer may vary in thickness depending on the desired end use of the blister package. Generally the front blister sheet has a thickness ranging from 8 to 20 mil, preferably 10 to 15 mil, e.g., about 12 mil.

The front blister sheet is releasably sealed to an oriented polypropylene sheet 16 through a first adhesive layer 18 which is interposed between sheet 16 and sheet 12. The first adhesive layer comprises a controlled release adhesive which has an adhesion of 300–1200 grams per inch, preferably 400 to 600 grams per inch, as measured by a Wrap-Aide™ Crimp Sealer at 280° F. The first adhesive layer can comprise acrylic or polyvinylidene (PVDC) adhesive. Examples of suitable acrylic adhesives are acrylic based terpolymers set out in U.S. Pat. No. 3,753,769, incorporated herein by reference in its entirety. Examples of suitable PVDC adhesives are set out in U.S. Pat. No. 4,447,494, incorporated herein by reference in its entirety.

The first adhesive can be applied directly to the front blister sheet or to the oriented polypropylene sheet in suitable amounts. Preferably such amounts are less than 25 wt %, preferably 10 to 20 wt %, say, 1 to 2 wt % of the total weight of the front blister sheet in order to facilitate recycle of said sheet. The first adhesive layer can be applied over the entire surface between layers 12 and 16 or preferably applied only at areas where the surfaces of layers 12 and 16 are sealed as shown in the FIGURE.

The oriented polyolefin sheet 16 can itself be further modified by providing a wettable skin 17 between layers 16 and 12 which serves to improve the bond strengths of the adhesive to the polypropylene. Such wettable skin can be made by corona discharge treatment, flame treatment, or chemical treatment of the surface of the oriented polyolefin sheet.

The oriented polyolefin sheet 16 can be further modified by providing an adhesion promoting skin 20 which serves to promote adhesion between sheet 16 via a second adhesive 22 interposed between said sheet and paper backing 24. The adhesion promoting skin can be made by coextruding polyethylene, copolymers of polyethylene and polypropylene and/or terpolymers of polyethylene, polypropylene, and polybutene-1, as well as other adhesion promoting polymers known to those skilled in the art.

The second adhesive 22 is any suitable adhesive which is capable of adhering paper backing 24 to said oriented polyolefin sheet 16 (or adhesion promoting skin 20). Preferably such adhesives provide adhesion levels sufficient to result in fiber tear upon separation of the polyolefin sheet 16 from said paper backing 24. Such adhesives include two part urethane, single component water base urethanes such as Lamal T-8, available from Morton-Thiokol, Inc. of Chicago, Ill., U.S.A., single component solvent base urethane such as Morton 333, available from Morton Chemical Division of Morton-Norwich Products, Inc., acrylics, polyesters or polyethylenes.

The paper backing 24 is any paper or card stock which comprises cellulose fiber and is suited to use as backing in blister packaging applications. Examples of such materials include 12 point unbleached kraft board and 20 point sulfite bleached stock. The thickness of the backing can range from 3 to 40 mils, preferably 8 to 20 mils.

The resulting blister package 10 can be opened by separating the laminated paper board/oriented polypropylene composite from front blister sheet 16. The pulling apart of these components preferably results in adherence of the first adhesive layer 18 to the front blister sheet 16. This results in a reusable front blister sheet which can be readhered to the laminated paper board/OPP composite or another suitable backing. The front blister sheet containing minimal amounts of adhesive, e.g., less than 0.5 wt % is readily recycled inasmuch as the adhesive is present in amounts which are minimally if at all deleterious to the recycle process.

What is claimed is:

1. A reusable or recyclable blister package comprising:
   A) a first sheet selected from the group consisting of polyethylene terephthalate (PET), polyvinyl chloride (PVC), and polyvinyl chloride (PVC) coated with polyvinylidene chloride (PVDC) having a blister which forms a compartment;
   B) a second sheet releasably adhered to said first sheet, said second sheet comprising an oriented polypropylene (OPP) peel seal film having its side proximal to said first sheet coated with a first adhesive having controlled adhesion of 300–1200 grams per inch; and
   C) a third sheet of card or paper stock which is adhered to said second sheet at at least fiber tear adhesion levels with a second adhesive.

2. The blister package of claim 1 wherein said second sheet is peelable from said first sheet upon opening of said blister package with at least a portion of said first adhesive adhering to said first sheet.

3. The blister package of claim 1 wherein said first adhesive is selected from the group consisting of acrylic and polyvinylidene chloride sealants having a controlled adhesion of 400 to 800 grams per inch and said second adhesive is selected from the group consisting of urethane, acrylic, polyester, and polyvinylchloride.

4. The blister package of claim 1 wherein said second sheet comprising an oriented polypropylene (OPP) peel seal film has a sealable skin on its side proximal to said first sheet and an adhesion promoting skin on its side proximal to said third sheet.

5. The blister package of claim 1 wherein said first adhesive is present in amounts less than 15 wt % of said first sheet.

6. The blister package of claim 1 wherein said second adhesive is present in amounts less than 30 wt % of said first sheet.

7. The blister package of claim 1 wherein said first sheet comprises polyethylene terephthalate (PET) and said first adhesive is acrylic.

8. The blister package of claim 1 wherein said first sheet comprises polyvinyl chloride (PVC) and said first adhesive is acrylic.

9. The blister package of claim 1 wherein said first adhesive adheres to said first sheet and separates from said second sheet upon opening of the package by separating said first sheet from said second sheet.

10. A reusable or recyclable blister package comprising:
    A) a first sheet selected from the group consisting of polyethylene terephthalate (PET), polyvinyl chloride (PVC), and polyvinyl chloride (PVC) coated with polyvinylidene chloride (PVDC) having a blister which forms a compartment, said first sheet being coated with a first adhesive having controlled adhesion of 300–600 grams per inch;
    B) a second sheet releasably adhered to said first sheet by said first adhesive, said second sheet comprising an oriented polypropylene (OPP) peel seal film; and
    C) a third sheet of card or paper stock which is adhered to said second sheet at at least fiber tear adhesion levels with a second adhesive.

11. The blister package of claim 10 wherein said first adhesive is selected from the group consisting of acrylic and polyvinylidene chloride sealants having a controlled adhesion of 400 to 800 grams per inch and said second adhesive is selected from the group consisting of urethane, acrylic, and polyethylene.

12. The blister package of claim 10 wherein said second sheet comprising an oriented polypropylene (OPP) peel seal film has a wettable skin on its side proximal to said first sheet and an adhesion promoting skin on its side proximal to said third sheet.

13. The blister package of claim 1 wherein said first adhesive comprises less than 15 wt % of said first sheet.

14. The blister package of claim 1 wherein said first adhesive comprises less than 30 wt % of said first sheet.

15. The blister package of claim 1 wherein said first sheet comprises polyethylene terephthalate (PET) and said first adhesive is acrylic.

16. The blister package of claim 1 wherein said first sheet comprises polyvinyl chloride (PVC) and said first adhesive is acrylic.

* * * * *